(12) United States Patent
Liu et al.

(10) Patent No.: US 11,175,236 B2
(45) Date of Patent: Nov. 16, 2021

(54) IMAGE ACQUISITION SYSTEM AND IMAGE ACQUISITION METHOD

(71) Applicants: Tyco Electronics (Shanghai) Co. Ltd., Shanghai (CN); TE Connectivity Corporation, Berwyn, PA (US)

(72) Inventors: Hongtao Liu, Shanghai (CN); Dandan Zhang, Shanghai (CN); Roberto Francisco-Yi Lu, Bellevue, WA (US); Changjun Wang, Shanghai (CN); Lei Zhou, Shanghai (CN); Zongjie Tao, Shanghai (CN)

(73) Assignees: Tyco Electronics (Shanghai) Co. Ltd., Shanghai (CN); TE Connectivity Corporation, Berwyn, PA (US)

( * ) Notice: Subject to any disclaimer, the term of this patent is extended or adjusted under 35 U.S.C. 154(b) by 106 days.

(21) Appl. No.: 16/567,411

(22) Filed: Sep. 11, 2019

(65) Prior Publication Data
US 2020/0080944 A1 Mar. 12, 2020

(30) Foreign Application Priority Data
Sep. 12, 2018 (CN) .......................... 201811063242.X

(51) Int. Cl.
| | |
|---|---|
| *G01N 21/88* | (2006.01) |
| *B25J 9/16* | (2006.01) |
| *G01N 21/84* | (2006.01) |

(52) U.S. Cl.
CPC ........ *G01N 21/8851* (2013.01); *B25J 9/1697* (2013.01); *G01N 2021/8455* (2013.01)

(58) Field of Classification Search
CPC .... G01N 33/5308; G01N 33/74; G01N 21/51; G01N 23/046; G01N 2223/419;
(Continued)

(56) References Cited

U.S. PATENT DOCUMENTS

| | | | | |
|---|---|---|---|---|
| 4,146,924 A | * | 3/1979 | Birk ........................ | B25J 9/1692 318/568.13 |
| 4,412,293 A | * | 10/1983 | Kelley ................. | B25J 15/0266 414/730 |

(Continued)

FOREIGN PATENT DOCUMENTS

| | | |
|---|---|---|
| CA | 2577269 A1 | 7/2008 |
| CA | 2893590 A1 | 6/2014 |

(Continued)

OTHER PUBLICATIONS

Abstract of CN103723677, dated Apr. 20, 2016, 1 page.

*Primary Examiner* — Michael P Stafira
(74) *Attorney, Agent, or Firm* — Barley Snyder

(57) ABSTRACT

An image acquisition system includes a feeding unit supplying a product, a product pickup platform onto which the product is supplied by the feeding unit, and a camera capturing an image of the product on the product pickup platform. The camera identifies a position and an angle of the product based on the image. The image acquisition system includes a robot gripping the product from the product pickup platform based on the position and the angle identified by the camera and an image acquisition platform onto which the product is placed by the robot. An imaging microscope of the image acquisition system captures an image of a surface of the product facing upwards on the image acquisition platform and a computer stores the image of the surface of the product captured by the imaging microscope.

18 Claims, 1 Drawing Sheet

(58) Field of Classification Search
CPC ....... G01N 2223/505; G01N 33/54373; G01N 33/56972; G01N 33/82; G01N 2035/00495; G01N 2223/108; G01N 23/2255; G01N 35/10; G01N 1/4077; G01N 2001/4083; G01N 2035/1018; G01N 21/00; G01N 21/0303; G01N 21/59; G01N 2333/575; G01N 2333/62; G01N 2333/91188; G01N 2333/96463; G01N 33/54326; G01N 33/54393; G01N 33/56983; G01N 33/573; G01N 33/743; G01N 33/80; G01N 33/92; G01N 21/31; G01N 21/636; G01N 2333/726; G01N 2458/00; G01N 2500/02; G01N 2500/04; G01N 33/54313; G01N 33/56966; G01N 33/583; G01N 33/587; G01N 33/6845; G01N 23/207; G01N 11/00; G01N 15/1436; G01N 15/1459; G01N 2011/008; G01N 2021/0346; G01N 2021/4707; G01N 2021/4709; G01N 2021/513; G01N 21/03; G01N 2201/08; G01N 2223/611; G01N 15/0211; G01N 2015/0222; G01N 23/201; G01N 33/582; G01N 2035/0094; G01N 21/84; G01N 2333/75; G01N 33/4905; G01N 33/86; G01N 35/0092; G01N 15/14; G01N 15/1434; G01N 2015/0038; G01N 2015/0238; G01N 2015/025; G01N 2015/0277; G01N 2035/00881; G01N 21/25; G01N 21/4795; G01N 21/6428; G01N 21/65; G01N 21/9501; G01N 21/95623; G01N 2201/0675; G01N 2201/129; G01N 2223/302; G01N 2223/306; G01N 2223/639; G01N 2223/643; G01N 2223/645; G01N 23/04; G01N 23/203; G01N 15/0205; G01N 15/1427; G01N 15/1429; G01N 15/1456; G01N 15/1463; G01N 15/1475; G01N 15/1484; G01N 2015/0053; G01N 2015/0092; G01N 2015/1006; G01N 2015/1075; G01N 2015/1402; G01N 2015/1438; G01N 2015/1454; G01N 2021/1785; G01N 2021/479; G01N 2021/6471; G01N 2030/8447; G01N 2035/00326; G01N 21/53; G01N 21/6408; G01N 21/645; G01N 21/6458; G01N 2201/1045; G01N 23/041; G01N 23/18; G01N 23/20; G01N 23/20008; G01N 23/20016; G01N 23/20025; G01N 23/205; G01N 23/2055; G01N 30/74; G01N 33/381; G01N 33/552; G01N 33/553; G01N 35/00069; G01N 35/00871; G01N 35/026; G01N 35/1065; G01N 35/1097; G01N 2035/00138; G01N 35/00029; G01N 35/0099; G01N 35/1002; G01N 2035/00861; G01N 35/04; G01N 1/30; G01N 2035/00425; G01N 2035/00752; G01N 2035/00831; G01N 2035/0406; G01N 2035/0465; G01N 2035/1025; G01N 2035/1032; G01N 2035/1034; G01N 33/00; G01N 35/1079; G01N 1/312; G01N 35/00732; G01N 2035/00039; G01N 1/44; G01N 2035/00346; G01N 2035/00386; G01N 2035/00801; B25J 9/1697; B25J 9/1664; B25J 9/1687; B25J 19/023; B25J 9/1612; B25J 9/163; B25J 9/0093; B25J 9/1661; B25J 9/1679; B25J 13/08; B25J 15/0616; B25J 9/162; B25J 9/1653; B25J 11/0045; B25J 5/007; B25J 9/161; B25J 9/1666; B25J 9/1669; B25J 11/008; B25J 19/021; B25J 19/022; B25J 9/0084; B25J 9/08; B25J 9/1633; B25J 9/1671; B25J 9/1694; B25J 15/0052; B25J 19/02; B25J 19/04; B25J 9/1617; B25J 9/1656; B25J 9/1674; B25J 9/1676; B25J 11/00; B25J 11/005; B25J 13/006; B25J 13/02; B25J 13/082; B25J 13/085; B25J 13/088; B25J 13/089; B25J 15/0004; B25J 15/0014; B25J 15/0019; B25J 15/04; B25J 15/0408; B25J 15/06; B25J 15/0633; B25J 15/0658; B25J 15/0675; B25J 19/00; B25J 19/005; B25J 5/00; B25J 5/02; B25J 9/0003; B25J 9/0009; B25J 9/0087; B25J 9/0096; B25J 9/023; B25J 9/026; B25J 9/041; B25J 9/123; B25J 9/126; B25J 9/1602; B25J 9/1635; B25J 9/1638; B25J 9/1651; B25J 9/1682; B25J 9/1684; B25J 9/1692

See application file for complete search history.

(56) References Cited

U.S. PATENT DOCUMENTS

| | | | | |
|---|---|---|---|---|
| 9,333,649 | B1* | 5/2016 | Bradski | G06T 7/60 |
| 2006/0115889 | A1* | 6/2006 | Nakashima | C12M 23/50 |
| | | | | 435/286.2 |
| 2010/0028124 | A1* | 2/2010 | Lackner | G01N 35/0099 |
| | | | | 414/806 |
| 2010/0101191 | A1* | 4/2010 | Lindee | B65B 57/14 |
| | | | | 53/471 |
| 2010/0288060 | A1* | 11/2010 | Ronsick | C12Q 1/24 |
| | | | | 73/864.63 |
| 2012/0209429 | A1* | 8/2012 | Yamaguchi | B25J 9/1697 |
| | | | | 700/259 |
| 2012/0226382 | A1* | 9/2012 | Asada | B25J 9/1605 |
| | | | | 700/259 |
| 2013/0131853 | A1* | 5/2013 | Regan | B25J 9/1687 |
| | | | | 700/114 |
| 2014/0121836 | A1* | 5/2014 | Ban | B25J 9/0093 |
| | | | | 700/259 |
| 2014/0291515 | A1* | 10/2014 | Tajima | H01J 37/244 |
| | | | | 250/310 |
| 2017/0057026 | A1* | 3/2017 | Shen | B25J 15/0057 |
| 2018/0056523 | A1* | 3/2018 | Aiso | B25J 9/1697 |
| 2019/0375110 | A1* | 12/2019 | Oishi | B25J 13/088 |
| 2019/0389070 | A1* | 12/2019 | Sirkett | B25J 9/1697 |
| 2020/0130961 | A1* | 4/2020 | Diankov | B25J 9/1687 |
| 2021/0022559 | A1* | 1/2021 | Zito | A47J 44/00 |
| 2021/0053230 | A1* | 2/2021 | Mizoguchi | B25J 9/1612 |
| 2021/0069904 | A1* | 3/2021 | Duan | B25J 19/023 |

FOREIGN PATENT DOCUMENTS

| | | |
|---|---|---|
| CN | 101119922 B | 11/2008 |
| CN | 103723677 B | 4/2016 |

* cited by examiner

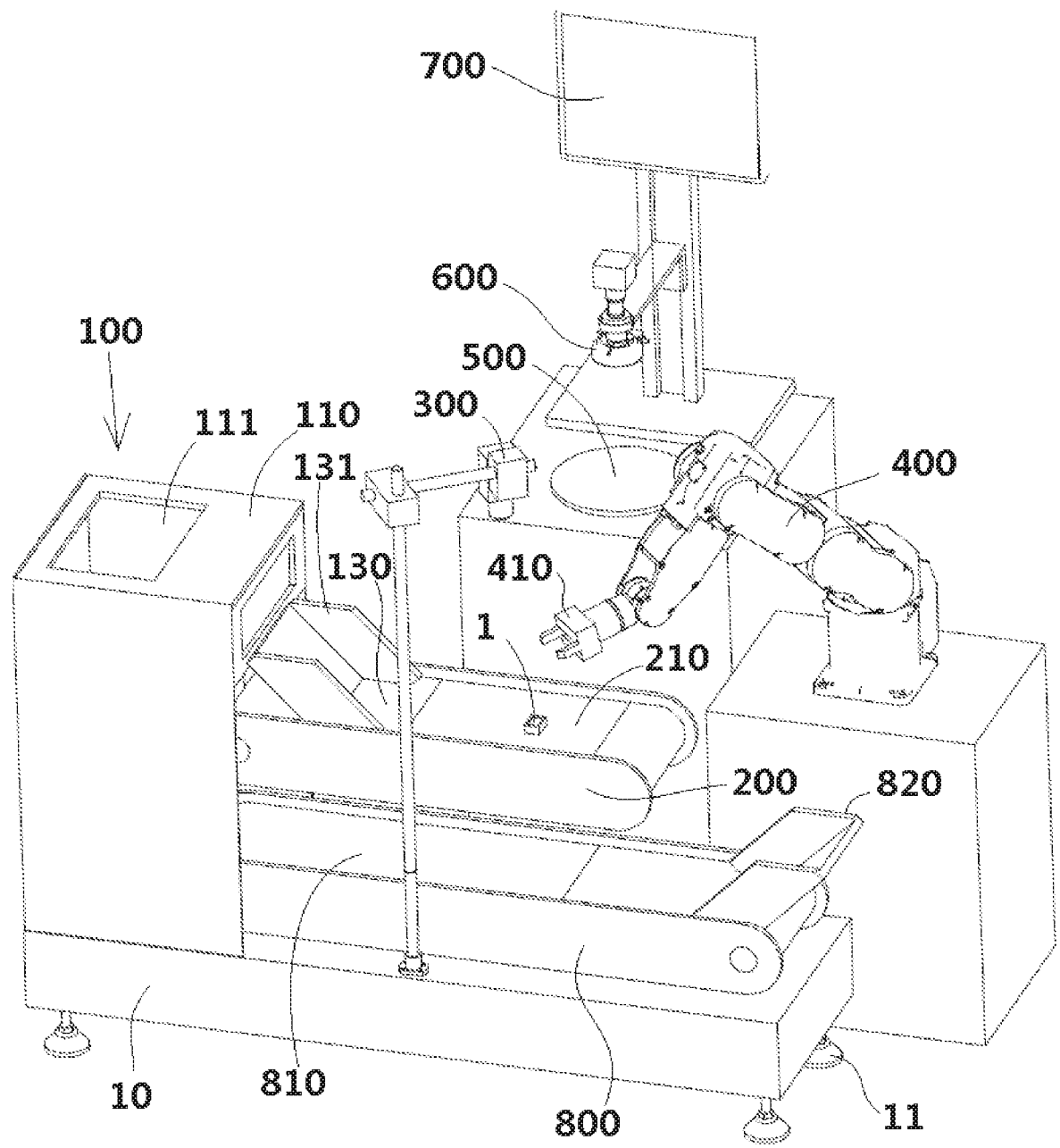

IMAGE ACQUISITION SYSTEM AND IMAGE ACQUISITION METHOD

CROSS-REFERENCE TO RELATED APPLICATION

This application claims the benefit of the filing date under 35 U.S.C. § 119(a)-(d) of Chinese Patent Application No. 201811063242.X, filed on Sep. 12, 2018.

FIELD OF THE INVENTION

The present invention relates to an image acquisition system and, more particularly, to an image acquisition system adapted to capture an image of a product.

BACKGROUND

A machine vision system is widely used in industrial production. An artificial intelligence system (AI) and a machine learning system (ML) play a huge role in identification and classification of features of a product. In order to accurately and efficiently identify the features and categories of the product, the AI and the ML are generally trained with pre-captured product images. Thousands of pre-captured product images are used during the training, so that the AI and the ML may accurately store distinguishing features of each surface of the product. After the training is completed, the AI and the ML may quickly and accurately identify the product based on surface characteristics thereof.

The images of the respective surfaces of the product are usually captured by a manual photographing method. For example, the images of the respective surfaces of the product are captured manually and individually with a camera. However, at least thousands of images of the product are needed to train the AI and the ML, which would require workers to take weeks or even longer to photograph these images. Therefore, the method for manually capturing the images has very low efficiency and accuracy, which affects the training of the AI and the ML.

SUMMARY

An image acquisition system includes a feeding unit supplying a product, a product pickup platform onto which the product is supplied by the feeding unit, and a camera capturing an image of the product on the product pickup platform. The camera identifies a position and an angle of the product based on the image. The image acquisition system includes a robot gripping the product from the product pickup platform based on the position and the angle identified by the camera and an image acquisition platform onto which the product is placed by the robot. An imaging microscope of the image acquisition system captures an image of a surface of the product facing upwards on the image acquisition platform and a computer stores the image of the surface of the product captured by the imaging microscope.

BRIEF DESCRIPTION OF THE DRAWINGS

The invention will now be described by way of example with reference to the accompanying FIGURE, of which:

The FIGURE is a perspective view of an image acquisition system according to an embodiment.

DETAILED DESCRIPTION OF THE EMBODIMENT(S)

The invention will be described hereinafter in detail with reference to the following embodiments, taken in conjunction with the accompanying drawings. In the specification, the same or similar reference numerals indicate the same or similar parts. The description of the embodiments hereinafter with reference to the accompanying drawings is intended to explain the general inventive concept of the disclosure and should not be construed as a limitation on the disclosure.

In addition, in the following detailed description, for the sake of explanation, numerous specific details are set forth in order to provide a thorough understanding of the disclosed embodiments. It will be apparent, however, that one or more embodiments may also be practiced without these specific details. In other instances, well-known structures and devices are illustrated schematically in order to simplify the drawing.

An image acquisition system according to an embodiment, as shown in the FIGURE, comprises a feeding unit 100, a product pickup platform 200, a camera 300, a robot 400, an image acquisition platform 500, an imaging microscope 600 and a computer (not shown). The feeding unit 100 is adapted to supply a product 1 onto the product pickup platform 200. The camera 300 is adapted to capture an image of the product 1 supplied onto the product pickup platform 200 and identify a position and an angle of the product 1 based on the captured image. The robot 400 is adapted to grip the product 1 from the product pickup platform 200 based on the position and the angle identified by the camera 300 and to place the gripped product 1 on the image acquisition platform 500. The imaging microscope 600 is adapted to capture an image of a surface of the product 1 facing upwards on the image acquisition platform 500. The computer is adapted to store the image of the product 1 captured by the imaging microscope 600.

The product pickup platform 200, as shown in the FIGURE, includes a first endless conveyor belt 210 onto which the product 1 is supplied by the feeding unit 100, a driving motor adapted to drive the first endless conveyor belt 210 to move along an endless path, and a controller adapted to control start and stop of the feeding unit 100 and the driving motor. The feeding unit 100 and the driving motor are switched off by the controller when the product 1 on the first endless conveyor belt 210 is moved to a predetermined position in the field of view of the camera 300. In this way, the product 1 on the first endless conveyor belt 210 will remain stationary.

The camera 300, as shown in the FIGURE, is adapted to capture the image of the product 1 in a state where the feeding unit 100 and the driving motor are switched off, i.e., capture the image of the product 1 when the product 1 on the first endless conveyor belt 210 remains stationary. The product 1 is gripped by the robot 400 when the feeding unit 100 and the driving motor are stopped.

The product pickup platform 200, as shown in the FIGURE, includes a position sensor adapted to detect whether the product 1 on the first endless conveyor belt 210 has been moved to the predetermined position in the field of view of the camera 300. The feeding unit 100 and the first endless conveyor belt 210 are switched off by the controller when the position sensor detects that the product 1 on the first endless conveyor belt 210 has been moved to the predetermined position in the field of view of the camera 300.

The feeding unit 100, as shown in the FIGURE, includes a storage box 110, a vertical conveyor mechanism disposed in the storage box 110, and a vibration conveyor mechanism 130 disposed on top of the vertical conveyor mechanism. The storage box 110 is adapted to contain the product 1. The vertical conveyor mechanism is adapted to convey the product 1 in the storage box 110 upwardly onto the vibratory conveyor mechanism 130. The vibration conveyor mechanism 130 is adapted to convey the product 1 forwards in a vibrating manner such that the products 1 are evenly dispersed and conveyed onto the product pickup platform 200. The storage box 110 has a feeding opening 111 through which the product 1 is loaded into the storage box 110.

The feeding unit 100, as shown in the FIGURE, includes an inclined guide plate 131 disposed between a discharge opening of the storage box 110 and the vibration conveyor mechanism 130. The vertical conveyor mechanism is adapted to lift and convey the product 1 to the discharge opening of the storage box 110 such that the product 1 is output from the discharge opening of the storage box 110 onto the inclined guide plate 131 and slides down therefrom onto the vibration conveyor mechanism 130.

The vertical conveyor mechanism includes an endless conveyor belt and a plurality of step plates mounted on the endless conveyor belt. The product 1 in the storage box 110 is adapted to be carried on the step plates moving with the endless conveyor belt so that the product 1 carried on the step plates is conveyed upwardly onto the vibration conveyor mechanism 130.

The robot 400, shown in the FIGURE, is further adapted to reverse the product 1 on the image acquisition platform 500 to allow each of the surfaces of the product 1 to sequentially face upwards, so that the image of each of the surfaces of the product 1 is captured by the imaging microscope 600. A gripper 410 is mounted on the robot 400 to grip the product 1. The robot 400 is a multi-degree-of-freedom robot, for example, a six-axis robot.

The imaging microscope 600, shown in the FIGURE, includes an autofocus lens unit automatically adjusting a focal length of the imaging microscope 600 based on a size of the surface of the product 1 to be captured and a distance between the surface of the product 1 to be captured and the imaging microscope 600 to allow the imaging microscope 600 to be automatically focusable.

The image acquisition system, as shown in the FIGURE, includes a display 700 in communication with the imaging microscope 600 to displaying the image captured by the imaging microscope 600.

The image acquisition system, as shown in the FIGURE, includes an endless conveyor mechanism 800 arranged below the product pickup platform 200. The product 1, which is not gripped by the robot 400, on the product pickup platform 200 falls onto the endless conveyor mechanism 800 and is conveyed into the storage box 110 of the feeding unit 100 by the endless conveyor mechanism 800. The endless conveyor mechanism 800 has a first end extending into the storage box 110 to feed the product 1 back into the storage box 110, and a second end located below an end of the product pickup platform 200 to receive the product 1 fallen off the end of the product pickup platform 200.

The endless conveyor mechanism 800, as shown in the FIGURE, includes an endless conveyor belt 810 and a driver adapted to drive the endless conveyor belt 810 to move along an endless path. The product 1 is carried on the endless conveyor belt 810 and fed back into the storage box 110 by the endless conveyor belt 810. An end baffle 820 is mounted at the second end of the endless conveyor mechanism 800 to prevent the products 1 from falling off an end of the endless conveyor belt 810.

The image acquisition system, as shown in the FIGURE, includes a base 10 on which the feeding unit 100, the product pickup platform 200, the camera 300, the robot 400, the image acquisition platform 500, the imaging microscope 600, the computer, the display 700, and the endless conveyor mechanism 800 as described above are supported. The base 10 has a plurality of support legs 11 or support rollers on a bottom of the base 10.

A method for acquiring an image of a product using the image acquisition system will be described below with reference to the FIGURE. The method comprises steps of:
  providing the image acquisition system;
  supplying the product 1 onto the product pickup platform 200 with the feeding unit 100;
  identifying the position and the angle of the product 1 on the product pickup platform 200 with the camera 300;
  gripping the product 1 from the product pickup platform 200 with the robot 400 based on the position and the angle identified by the camera 300, and placing the gripped product 1 onto the image acquisition platform 500;
  capturing the image of the surface of the product 1 facing upwards on the image acquisition platform 500 with the imaging microscope 600; and
  storing the image captured by the imaging microscope 600 in the computer.

In an embodiment, the capturing step includes reversing the product 1 on the image acquisition platform 500 with the robot 400 such that each of the surfaces of the product 1 sequentially faces upwards to allow the imaging microscope 600 to capture the image of each of the surfaces of the product 1.

It should be appreciated by those skilled in this art that the above embodiments are intended to be illustrative, and many modifications may be made to the above embodiments by those skilled in this art, and various structures described in various embodiments may be freely combined with each other without conflicting in configuration or principle. Although several exemplary embodiments have been shown and described, it would be appreciated by those skilled in the art that various changes or modifications may be made to these embodiments without departing from the principles and spirit of the disclosure, the scope of which is defined by the claims and their equivalents.

What is claimed is:

1. An image acquisition system, comprising:
  a feeding unit supplying a product;
  a product pickup platform including a first endless conveyor onto which the product is supplied by the feeding unit;
  a camera capturing an image of the product on the product pickup platform and identifying a position and an angle of the product based on the image, the feeding unit and the first endless conveyor being switched off when the product on the first endless conveyor is moved to a predetermined position in a field of view of the camera;
  a robot gripping the product from the product pickup platform based on the position and the angle identified by the camera;
  an image acquisition platform onto which the product is placed by the robot; and
  an imaging microscope capturing an image of a surface of the product facing upwards on the image acquisition platform.

2. The image acquisition system of claim 1, wherein the camera captures the image of the surface of the product in a state in which the feeding unit and the first endless conveyor are switched off, and the product is gripped by the robot in the state in which the feeding unit and the first endless conveyor are switched off.

3. The image acquisition system of claim 2, wherein the product pickup platform is adapted to detect whether the product on the first endless conveyor has been moved to the predetermined position in the field of view of the camera.

4. The image acquisition system of claim 1, wherein the feeding unit includes:
a storage box adapted to contain the product and a vertical conveyor mechanism; and
a vibration conveyor mechanism receiving products conveyed upwardly in the storage box and conveying the product forwards in a vibrating manner such that the product is evenly dispersed and conveyed onto the product pickup platform.

5. The image acquisition system of claim 4, wherein the storage box has a feeding opening through which the product is loaded into the storage box.

6. The image acquisition system of claim 1, wherein the robot moves the product on the image acquisition platform to allow each of a plurality of surfaces of the product to sequentially face upwards, so that an image of each of the surfaces of the product is captured by the imaging microscope.

7. The image acquisition system of claim 1, wherein the imaging microscope automatically adjusts a focal length of the imaging microscope based on a size of the surface of the product and a distance between the surface of the product and the imaging microscope to allow the imaging microscope to be automatically focusable.

8. The image acquisition system of claim 1, further comprising a display in communication with the imaging microscope to display the image captured by the imaging microscope.

9. The image acquisition system of claim 4, further comprising an endless conveyer mechanism arranged below the product pickup platform.

10. The image acquisition system of claim 9, wherein the product on the product pickup platform that is not gripped by the robot falls onto the endless conveyor mechanism and is conveyed into the storage box by the endless conveyor mechanism.

11. The image acquisition system of claim 10, wherein the endless conveyor mechanism has a first end extending into the storage box to feed the product back into the storage box and a second end below an end of the product pickup platform to receive the product that falls off the end of the product pickup platform.

12. The image acquisition system of claim 11, wherein the endless conveyor mechanism includes an endless conveyor belt, the product is carried on the endless conveyor belt and fed back into the storage box by the endless conveyor belt.

13. The image acquisition system of claim 12, wherein an end baffle is mounted at the second end of the endless conveyor mechanism to prevent the product from falling off an end of the endless conveyor belt.

14. The image acquisition system of claim 1, wherein the robot has a gripper to grip the product.

15. An image acquisition method, comprising the steps of:
providing an image acquisition system including a feeding unit, a product pickup platform including a first endless conveyor, a camera, a robot, an image acquisition platform, and an imaging microscope;
supplying a product onto the product pickup platform with the feeding unit;
switching off the feeding unit and the first endless conveyor when the product on the first endless conveyor is moved to a predetermined position in a field of view of the camera;
identifying a position and an angle of the product on the product pickup platform with the camera;
gripping the product from the product pickup platform with the robot based on the position and the angle identified by the camera;
placing the product gripped by the robot onto the image acquisition platform;
capturing an image of a surface of the product facing upwards on the image acquisition platform with the imaging microscope; and
storing the image captured by the imaging microscope.

16. The image acquisition method of claim 15, wherein the capturing step includes moving the product on the image acquisition platform with the robot such that each of a plurality of surfaces of the product sequentially face upwards to allow the imaging microscope to capture an image of each of the surfaces of the product.

17. The image acquisition method of claim 15, wherein the feeding unit includes a storage box adapted to contain the product and a vibration conveyor mechanism, the method further comprising the steps of:
receiving products conveyed from the storage box; and
conveying the product forwards in a vibrating manner such that the product is evenly dispersed and conveyed onto the product pickup platform.

18. An image acquisition system, comprising:
a feeding unit supplying a product and including:
a storage box adapted to contain the product and a vertical conveyor mechanism; and
a vibration conveyor mechanism receiving products conveyed upwardly in the storage box and conveying the product forwards in a vibrating manner such that the product is evenly dispersed and conveyed onto the product pickup platform;
a product pickup platform onto which the product is supplied by the feeding unit;
a camera capturing an image of the product on the product pickup platform and identifying a position and an angle of the product based on the image;
a robot gripping the product from the product pickup platform based on the position and the angle identified by the camera;
an image acquisition platform onto which the product is placed by the robot; and
an imaging microscope capturing an image of a surface of the product facing upwards on the image acquisition platform.

* * * * *